(12) United States Patent
Gutta et al.

(10) Patent No.: US 8,682,890 B2
(45) Date of Patent: Mar. 25, 2014

(54) COLLABORATIVE SAMPLING FOR IMPLICIT RECOMMENDERS

(75) Inventors: Srinivas Gutta, Veldhoven (NL); Petrus Gerardus Meuleman, Eindhoven (NL); Wilhelmus Franciscus Johannes Verhaegh, Eindhoven (NL)

(73) Assignee: Pace Micro Technology PLC (GB)

( * ) Notice: Subject to any disclaimer, the term of this patent is extended or adjusted under 35 U.S.C. 154(b) by 1057 days.

(21) Appl. No.: 10/596,165

(22) PCT Filed: Nov. 30, 2004

(86) PCT No.: PCT/IB2004/052604
§ 371 (c)(1),
(2), (4) Date: Jun. 2, 2006

(87) PCT Pub. No.: WO2005/054788
PCT Pub. Date: Jun. 16, 2005

(65) Prior Publication Data
US 2007/0162440 A1    Jul. 12, 2007

Related U.S. Application Data

(60) Provisional application No. 60/526,756, filed on Dec. 3, 2003.

(51) Int. Cl.
*G06F 7/00* (2006.01)
*G06F 17/30* (2006.01)
*G06F 13/14* (2006.01)

(52) U.S. Cl.
USPC ........................................... 707/726; 725/46

(58) Field of Classification Search
USPC .......... 707/5, 4, 7, 726, 758, 791; 725/10–46; 705/14; 715/716–719
See application file for complete search history.

(56) References Cited

U.S. PATENT DOCUMENTS

| | | | |
|---|---|---|---|
| 6,088,722 A * | 7/2000 | Herz et al. ..................... 709/217 |
| 6,766,524 B1 * | 7/2004 | Matheny et al. ................. 725/23 |
| 6,934,964 B1 * | 8/2005 | Schaffer et al. ................. 725/46 |
| 7,188,355 B1 * | 3/2007 | Prokopenko et al. ........... 725/46 |
| 7,231,652 B2 * | 6/2007 | Gutta et al. ..................... 725/46 |
| 7,296,284 B1 * | 11/2007 | Price et al. ...................... 725/39 |
| 7,305,691 B2 * | 12/2007 | Cristofalo ....................... 725/34 |
| 2002/0174428 A1 | 11/2002 | Agnihotri et al. |
| 2005/0160458 A1 * | 7/2005 | Baumgartner .................. 725/46 |

(Continued)

FOREIGN PATENT DOCUMENTS

| WO | 0052930 A1 | 9/2000 |
| WO | 0115499 A1 | 3/2001 |
| WO | 0225938 A2 | 3/2002 |

*Primary Examiner* — Usmaan Saeed
*Assistant Examiner* — Cecile Vo
(74) *Attorney, Agent, or Firm* — McKee, Voorhees & Sease, P.L.C.

(57) ABSTRACT

A method for generating a recommendation is provided. The method includes the steps of: receiving at least one of a negative and positive example from one or more other users; and determining a recommendation for a user based on at least one of the negative and positive examples. The method can further include the step of generating a user profile for the user based on previous behavior of the user, in which case the determining step can include determining the recommendation based on the negative example and the user profile. The determining step can also include the step of determining the recommendation based on both of the negative and positive examples.

14 Claims, 2 Drawing Sheets

(56) References Cited

U.S. PATENT DOCUMENTS

2005/0251826 A1* 11/2005 Orr .................................. 725/46
2006/0026642 A1* 2/2006 Schaffer et al. ................. 725/46
2006/0059045 A1* 3/2006 Babbar et al. ................... 705/14
2006/0174260 A1* 8/2006 Gutta .............................. 725/13
2006/0174275 A1* 8/2006 Gutta .............................. 725/46
2007/0022440 A1* 1/2007 Gutta .............................. 725/46

* cited by examiner

COLLABORATIVE SAMPLING FOR IMPLICIT RECOMMENDERS

BACKGROUND OF THE INVENTION (1) Field of the Invention

The present invention relates generally to television recommender systems, and more particularly, to collaborative sampling for implicit recommender systems.

(2) Description of Related Art

A television recommender system computes recommendation scores for upcoming television shows by comparing their features to features in a user profile that indicate likes and dislikes. A television recommender system learns the user profile from a user's viewing history. A machine-learning algorithm requires both positive and negative examples in order to provide a television recommendation that covers the positive examples and avoids the negative examples.

In a viewing history, the viewer usually provides only positive examples, i.e., shows that are actually watched. Therefore the recommendation system must somehow create negative examples. Methods for collecting negative examples are known in the art. One method involves taking negative examples at the same time as the positive examples are acquired. Another method is as follows: for each given show that is watched, a show is uniformly picked from the space of all shows in the previous seven days excluding shows that were watched. This forms the negative example base. Once a negative example is generated, any recommender could be used to learn the concept description of liked vs. disliked in order to predict what shows the user might wish to watch.

Another sampling technique is the adaptive sampling technique that chooses negative samples depending upon the specific attributes of the shows that have been watched by the user. Some examples of these attributes are time, station-callsign, etc. More information regarding this technique can be found in co-pending U.S. patent application Ser. No. 09/819,286, the entire contents of which is incorporated herein by its reference.

Therefore it is an object of the present invention to provide methods and systems that overcome the disadvantages associated with the prior art.

BRIEF SUMMARY OF THE INVENTION

Accordingly, a method for generating a recommendation is provided. The method comprising: receiving at least one of a negative and positive example from one or more other users; and determining a recommendation for a user based on at least one of the negative and positive examples.

The method can further comprise generating a user profile for the user based on previous behavior of the user, wherein the determining can comprise determining the recommendation based on the negative examples and the user profile. The generating of the user profile can comprise generating an implicit user profile.

The determining can comprise determining the recommendation based on the negative and positive examples.

The recommendation can be a television program recommendation.

The method can further comprise: mapping the negative example to an electronic program guide database of the user; and determining an equivalent negative example for the user from the electronic program database. The method can further comprise: mapping the positive example to an electronic program guide database of the user; and determining an equivalent positive example for the user from the electronic program database.

The method can further comprise determining the one or more other users. The determining can comprise selecting the one or more other users based on geographical location of the one or more other users. The determining can comprise selecting the one or more other users based on a similarity of likes and/or dislikes with the one or more other users. The determining can comprise selecting the one or more other users by the user. In which case, the selecting can comprise: presenting a plurality of other users to the user; and the user selecting from among the plurality of other users to determine the one or more other users. The presenting can comprise presenting the plurality of users based on geographical location of the one or more other users and/or based on a similarity of likes and/or dislikes of the one or more other users. The selecting can also comprise the user indicating the one or more other users.

Also provided is an apparatus for generating a recommendation. The apparatus comprising: means for receiving at least one of a negative and positive example from one or more other users; and a recommender for determining a recommendation for a user based on at least one of the negative and positive examples.

The apparatus can further comprise a display operatively connected to the recommender for presenting a plurality of other users to the user.

The apparatus can further comprise means for selecting the one or more other users by the user from among the plurality of other users.

The means for receiving at least one of a negative and positive example from one or more other users can comprise a modem.

The apparatus can be a personal video recorder or a television.

Also provided are a computer program product for carrying out the methods of the present invention and a program storage device for the storage of the computer program product therein.

These and other features, aspects, and advantages of the apparatus and methods of the present invention will become better understood with regard to the following description, appended claims, and accompanying drawings where:

DETAILED DESCRIPTION OF A PREFERRED EMBODIMENT

Although this invention is applicable to numerous and various types of recommenders, it has been found also useful in the environment of television program recommenders. Therefore, without limiting the applicability of the invention to television program recommenders, the invention will be described in such environment. However, those skilled in the art will appreciate that the recommenders of the present invention have application in other environments, such as radio program recommenders, advertisement recommenders, and recommenders for goods and/or services.

Figure 1:
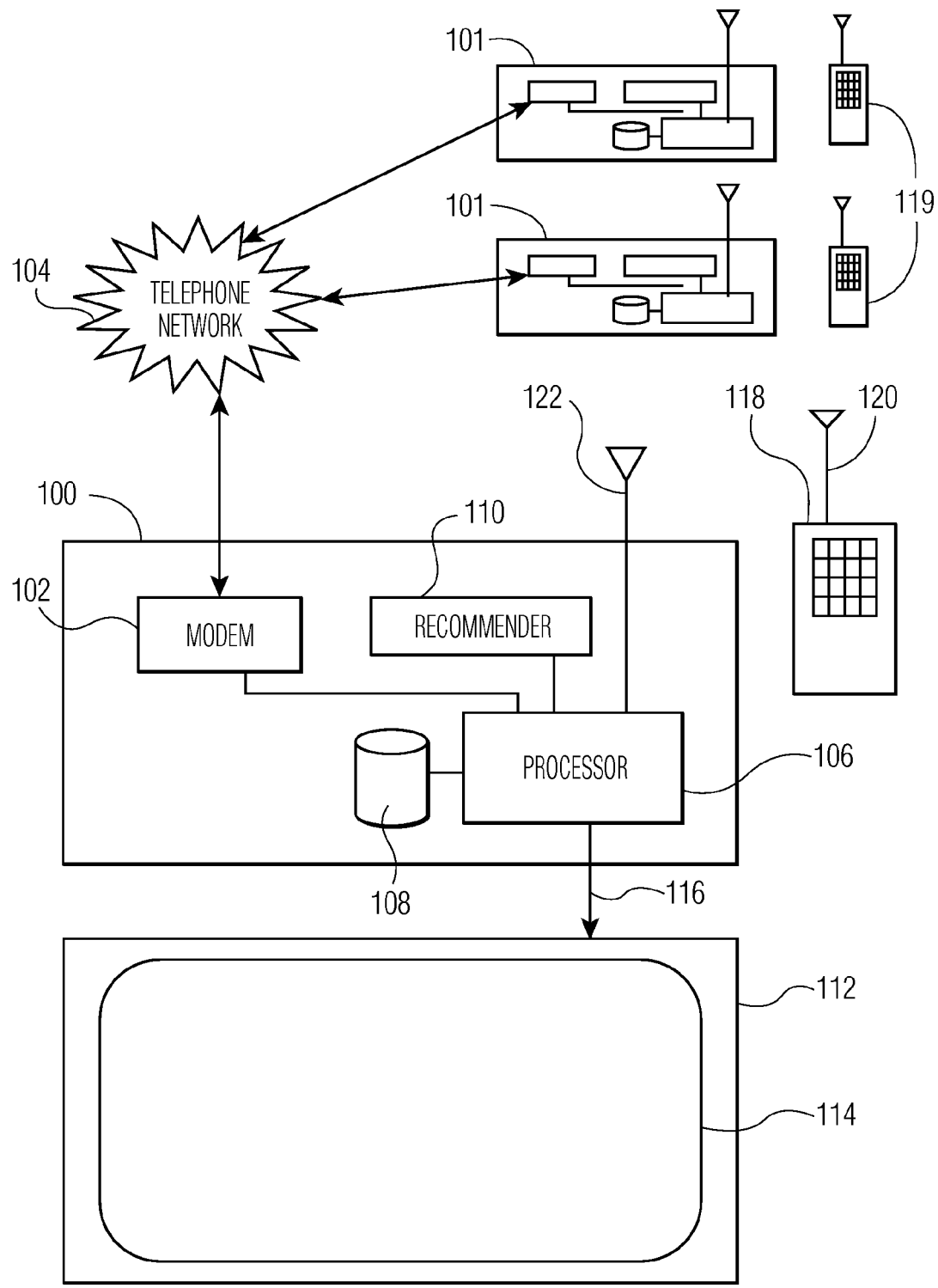
FIG. 1 illustrates an embodiment of a television recommender of the present invention.

Referring now to FIG. 1, there is shown an implementation of an apparatus for generating a recommendation for video content to a user, who in the case of television program recommendations will be referred to herein as a viewer, the apparatus being generally referred to by reference numeral 100. The apparatus may be a set-top box, such as a personal video recorder (PVR), as are known in the art, such as Replay TV® and TiVo®. In general, PVRs recommend video content, such as television shows, based on a user profile of the viewer stored in memory. The user profile indicates viewing preferences of the viewer based on the viewing history of a viewer and/or manual input by the viewer. As discussed above, negative and positive examples are needed to build the user profile and to generate a recommendation for a program. For purposes of this disclosure, "viewer" shall mean that person for whom the video content is being recommended and "users" shall mean those persons corresponding to the plurality of users in remote locations from the viewer. The users in the remote locations each preferably have a similarly equipped apparatus to that of apparatus 100 to the extent that they can also recommend video content, the apparatus of the users being referred to by reference numeral 101, such apparatus 101 are assumed to include similar features to that of apparatus 100. However, those skilled in the art will appreciate that apparatus 101 can be configured differently from apparatus 100 and still cooperate to perform the methods of the present invention. For example, the apparatus 101 of the user may be configured to build and store a user profile and positive and/or negative examples of the user but may not be capable of generating a recommendation.

The apparatus 100 generally has a means for receiving positive and/or negative examples from the users, such as a modem 102 operating over a telephone network 104, for accessing at least one of the other user apparatus 101 and to receive the positive and/or negative examples stored within the apparatus 101. The apparatus 100 further has a processor 106. As will be discussed below, a function of the processor, in addition to carrying out the typical functions of the apparatus 100, is to determine a recommendation for the viewer based on at least one of the negative and positive examples received from the users. The processor has a storage device 108 operatively connected thereto to store user profiles of the viewer, as well as video content, and instructions for carrying out the methods of the present invention and the typical functions of the apparatus 100. Although shown as a single storage device 108, more than one storage device can be provided for storing any one or more of the above. The apparatus further has a recommender 110 (alternatively known in the art as a recommendation engine) for determining a recommendation for video content based on a user profile. As will be discussed below, the recommender 110 will determine a recommendation based on at least one of the negative and positive examples from the users, or alternatively, based on a user profile of the viewer and one or more negative examples from the users.

Apparatus 100 further has a monitor 112 operatively connected thereto for displaying video content supplied by the apparatus 100 on a display 114 via signal line 116. The monitor 112 can be a television for receiving a broadcast, cable, or satellite signal, or a computer monitor for receiving a streaming video signal from a remote network, such as the Internet. The monitor 112 can also display a user interface generated by the apparatus 100 for inputting instructions to the apparatus 100. Specifically, as will be discussed below, the viewer can select or indicate the users from which he/she will receive the positive and/or negative examples from a suitable user interface displayed on the monitor 112. Construction of such a user interface is well within the knowledge of those of ordinary skill in the art, and as such, a detailed description thereof is omitted for the sake of brevity. The apparatus 100 further has a means for engaging with the user interface, such as a remote control 118. The remote control may be wireless, as is known in the art, and having a transmitter 120 in wireless communication with a receiver 122 operatively connected to the processor 106. The apparatus 101 corresponding to the other users may be similarly equipped with a remote control 119 and a user interface for interfacing with their apparatus 101, such as providing approval for transmitting positive and/or negative examples to the viewer.

Figure 2:
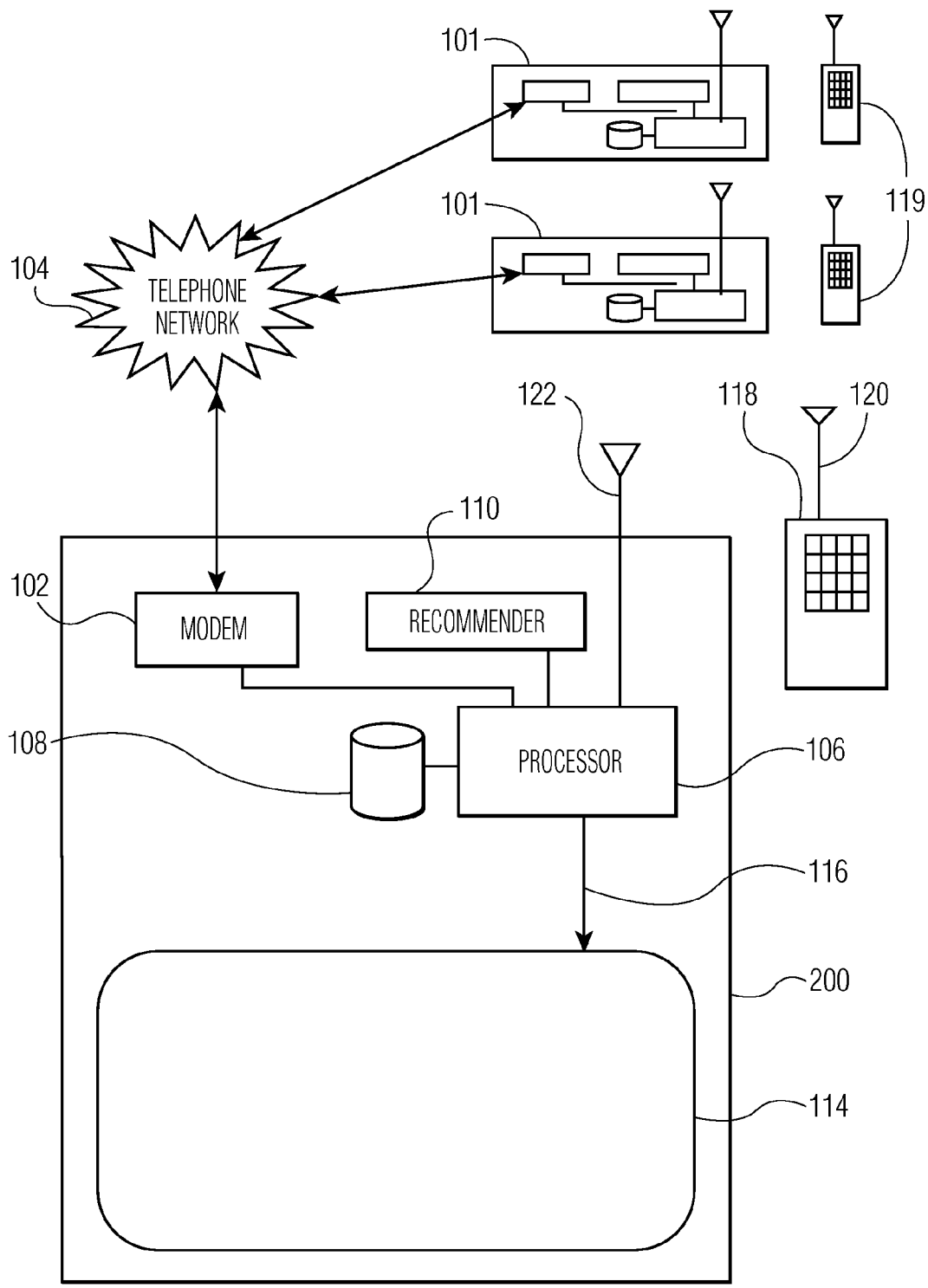
FIG. 2 illustrates another embodiment of the television recommender of FIG. 1.

FIG. 2 illustrates another embodiment of the recommender in which like features are referred to by like reference numerals. In the system of FIG. 2, the apparatus has a recommender integral with the monitor, the apparatus being referred to by reference numeral 200. The apparatus 200 can be a television for receiving a broadcast, cable, or satellite signal, or a computer monitor for receiving a streaming video signal.

A method for generating a recommendation for the viewer will now be discussed with reference to FIGS. 1 and 2. If approval is necessary and granted, the apparatus 101 of the users transmit at least one of a negative and positive example to the viewer's apparatus 100, 200 which is received by the apparatus 100, 200. The viewer's apparatus may also transmit a request to the user's apparatus 101 for such information, which the user can grant or deny. The user can grant or deny upon the request or the user can configure his/her apparatus 101 to grant or deny the request automatically. Such a configuration can be programmed through a suitable user interface at the user's apparatus 101. The means for transmitting the request and for receiving the positive and/or negative examples can be any type of software and/or hardware for data transmission known in the art, such as the modem 102. The modem 102 can operate over the telephone network 104 as shown in FIGS. 1 and 2 or over any other type of remote network, such as cable or Internet networks. The data can also be transmitted as part of the video signal to the apparatus 100, 200.

The apparatus 100, 200 utilizes at least one of the positive and negative examples as is known in the art to determine a recommendation for the viewer. If the viewer apparatus 100, 200 has already generated a user profile for the viewer based on previous behavior or explicit feedback of the viewer, the recommendation can be generated based on the negative examples and the user profile. The user profile can be implicitly or explicitly generated as are known in the art. However, if no or an insufficient user profile exists, the generation of the recommendation can be based on both the negative and positive examples. This may be the case where the viewer recently purchased and started using the apparatus 100 and has not yet built (or otherwise acquired) a user profile.

The users can be determined in any number of ways. In a first example, the users can be selected based on geographical location. For example, the apparatus 100 may select users from the same geographical location as the viewer. In this way, the EPG of the viewer and the users may be the same. Therefore, the fields of the EPG for the negative or positive example would be the same for the viewer and user. In another example, the apparatus 100, may select the users based on a similarity of likes and/or dislikes with the users. The similarity of like and/or dislikes may be determined from a comparison of user profiles of the viewer and users or determined from a "questionnaire" filled out by the viewer with the use of an appropriate user interface. However, in this example, since the user may be from a different geographical location than the viewer, it will be necessary to map the negative and/or positive examples to the EPG database of the viewer and to determine an equivalent negative example and/or positive example for the user from the EPG.

In yet another example, the viewer may manually select the users through an appropriate user interface. For example, a plurality of users can be displayed on the display 114 and the viewer can select from among the plurality of users to determine which ones he/she would like to receive positive and/or negative examples from. The apparatus 100 may present the plurality of users in any number of ways, such as randomly, alphabetically, based on geographical location, and/or based on a similarity of likes and/or dislikes of the users.

Further, the viewer may indicate the users to the apparatus 100, for example, by supplying a telephone number of the user, or some other identifying data, such as a web site, server address, or the like. The identifying data of the users can be entered into the apparatus 100, 200 by using a suitable user interface and a data input means, such as the remote control 120, or a keyboard (not shown).

The apparatus, either the viewer's 100 or users 101, can identify a negative example in any number of ways known in the art. A simple way would be through an explicit feedback from the user. An example of an implicit way to identify a negative example is to compare shows in the EPG to the user profile of the user and identify a show as a negative example if it has a certain degree of dissimilarity with the user profile. Yet another example is to sample the database of examples for a negative example for every positive example and check to see if the negative example is indeed a negative example for the other selected users. If it would be, then it is chosen as a negative example. If not it is ignored and the process is repeated for another negative example. Of course, for each negative example chosen, if it is determined that the corresponding user is from a different geographical location, the negative example must be mapped to the viewer's EPG as discussed above.

The methods of the present invention may be carried out by a computer software program, such computer software program may contain modules corresponding to the individual steps of the methods. Such software can of course be embodied in a computer-readable medium, such as an integrated chip or a peripheral device.

While there has been shown and described what is considered to be illustrative embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. A method for generating a recommendation of at least one television program for a viewer, the method comprising:
    using the viewer's television program recommender to access a plurality of user's recommenders at locations remote from that at which the viewer is located;
    using the viewer's recommender to communicate with a selection of the user's recommenders to generate data representing, at least one of a negative and positive example feedback from one or more selected other users recommenders to be received; and
    generating a recommendation for at least one television program to be watched in the future by the viewer based on at least one of the received negative and positive examples feedback;
    said generation of the recommendation being performed at the viewer location utilizing a processor provided as part of the viewer's television program recommender.

2. The method of claim 1, further comprising generating a user profile for the user based on previous behavior of the user, wherein the determining comprises determining the recommendation based on the negative example and the user profile.

3. The method of claim 2, wherein the generating of the user profile comprises generating an implicit user profile.

4. The method of claim 1, wherein the determining comprises determining the recommendation based on the negative and positive examples.

5. The method of claim 1, further comprising: mapping the negative example to an electronic program guide database of the user; and determining an equivalent negative example for the user from the electronic program database.

6. The method of claim 1, further comprising: mapping the positive example to an electronic program guide database of the user; and determining an equivalent positive example for the user from the electronic program database.

7. The method of claim 1, further comprising determining the one or more other users.

8. The method of claim 7, wherein the determining comprises selecting the one or more other users based on geographical location of the one or more other users.

9. The method of claim 7, wherein the determining comprises selecting the one or more other users based on a similarity of likes and/or dislikes with the one or more other users.

10. The method of claim 7, wherein the determining comprises selecting the one or more other users by the user.

11. The method of claim 10, wherein the selecting comprises: presenting a plurality of other users to the user; and the user selecting from among the plurality of other users to determine the one or more other users.

12. The method of claim 11, wherein the presenting comprises presenting the plurality of users based on geographical location of the one or more other users.

13. The method of claim 11, wherein the presenting comprises presenting the plurality of users based on a similarity of likes and/or dislikes of the one or more other users.

14. The method of claim 7, wherein the selecting comprises the user indicating the one or more other users.

\* \* \* \* \*